(12) United States Patent
Murakami et al.

(10) Patent No.: US 10,414,001 B2
(45) Date of Patent: Sep. 17, 2019

(54) GALVANOMETER SCANNER (71) Applicant: FANUC CORPORATION, Yamanashi (JP)

(72) Inventors: Yoshinori Murakami, Yamanashi (JP); Satoru Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/921,815

(22) Filed: Mar. 15, 2018

(65) Prior Publication Data

US 2018/0272474 A1   Sep. 27, 2018

(30) Foreign Application Priority Data

Mar. 23, 2017 (JP) ................................. 2017-057031

(51) Int. Cl.
| | | |
|---|---|---|
| *B23K 26/70* | (2014.01) | |
| *G02B 26/10* | (2006.01) | |
| *B23K 26/046* | (2014.01) | |
| *B23K 26/08* | (2014.01) | |
| *B23K 26/21* | (2014.01) | |
| *B23K 26/082* | (2014.01) | |

(52) U.S. Cl.
CPC .......... *B23K 26/704* (2015.10); *B23K 26/046* (2013.01); *B23K 26/082* (2015.10);
(Continued)

(58) Field of Classification Search
CPC ................ B23K 26/046; B23K 26/082; B23K 26/0884; B23K 26/21; B23K 26/704;
(Continued)

(56) References Cited

U.S. PATENT DOCUMENTS 6,845,190 B1 * 1/2005 Smithwick ........... A61B 1/0008
                                                    385/1
7,102,700 B1 * 9/2006 Pease ................... H04N 9/3129
                                                    348/744
(Continued)

FOREIGN PATENT DOCUMENTS

CN     101541470 A     9/2009
CN     104034258 A     9/2014
(Continued)

OTHER PUBLICATIONS

An Office Action mailed by the State Intellectual Property Office of the People's Republic of China dated Jan. 21, 2019, which corresponds to Chinese Patent Application No. 201810236554.X and is related to U.S. Appl. No. 15/921,815.

*Primary Examiner* — Dana Ross
*Assistant Examiner* — Joseph W Iskra
(74) *Attorney, Agent, or Firm* — Studebaker & Brackett PC (57) ABSTRACT

To provide a galvanometer scanner that increases reliability by reducing burden on a mechanism unit. A galvanometer scanner converts a command for machining position on a machining target to movement commands for a rotary motor, a rotary motor, and a direct drive mechanism. If the movement command for the direct drive mechanism contains a weak direct drive component depending on the movement command for the rotary motor, and falling within an amplitude range not exceeding a predetermined amplitude and within a frequency range not falling below a predetermined frequency, the galvanometer scanner removes the weak direct drive component from the movement command for the direct drive mechanism, and then outputs control signals corresponding to the movement commands for the rotary motors and the direct drive mechanism. The galvanometer scanner controls the rotary motors and the direct drive mechanism based on the control signals.

4 Claims, 7 Drawing Sheets

(52) U.S. Cl.
CPC .......... *B23K 26/0884* (2013.01); *B23K 26/21* (2015.10); *G02B 26/101* (2013.01); *G02B 26/105* (2013.01)

(58) Field of Classification Search
CPC .. B23K 26/38; B23K 26/044; B23K 26/0643; B23K 26/0648; B23K 26/0821; B23K 26/14; B23K 26/1462; B23K 26/16; B23K 26/083; G02B 26/101; G02B 26/105
USPC .................................................. 219/121.61
See application file for complete search history.

(56) References Cited

U.S. PATENT DOCUMENTS

2015/0343561 A1\* 12/2015 Miller .................. B23K 26/046 219/121.81
2017/0017054 A1\* 1/2017 Roffers .............. B23K 26/0648
2018/0369964 A1\* 12/2018 Grapov ................ G02B 26/101

FOREIGN PATENT DOCUMENTS

| EP | 3 117 948 A1 | 1/2017 |
|---|---|---|
| JP | H02-197813 A | 8/1990 |
| JP | H02-138089 U | 11/1990 |
| JP | H03-047671 U | 5/1991 |
| JP | H09-127454 A | 5/1997 |
| JP | 2003-043404 A | 2/2003 |
| JP | 2003-084225 A | 3/2003 |
| JP | 2005-040843 A | 2/2005 |
| JP | 2007-090352 A | 4/2007 |
| JP | 2008-216873 A | 9/2008 |
| JP | 2010-125510 A | 6/2010 |
| JP | 2012-137692 A | 7/2012 |
| JP | 2012-213262 A | 11/2012 |

\* cited by examiner

$$x = e \tan \theta_x + \sqrt{d^2 + y^2} \tan \theta_x = \left(e + \frac{d}{\cos \theta_y}\right) \tan \theta_x,$$

$$y = d \tan \theta_y,$$

$$f_r = \sqrt{\left(e + \sqrt{d^2 + y^2}\right)^2 + x^2},$$

$$\Delta f_r = \sqrt{\left(e + \sqrt{d^2 + y^2}\right)^2 + x^2} - (e + d),$$

$$\alpha_x = \frac{1}{2} \theta_x = \frac{1}{2} \arctan\left(\frac{x}{e + \sqrt{d^2 + y^2}}\right),$$

$$\alpha_y = \frac{1}{2} \theta_y = \frac{1}{2} \arctan\frac{y}{d},$$

| | | | |
|---|---|---|---|
| $(x, y)$ | COORDINATES OF SCANNING POINT ON MACHINING PLANE | $\Delta f_r$ | ERROR OCCURRING IN DEFOCUSING |
| $d$ | DISTANCE FROM Y MIRROR TO MACHINING PLANE | $\theta_x$ | OPTICAL ANGLE OF X MIRROR |
| $e$ | CENTER-TO-CENTER DISTANCE BETWEEN X MIRROR AND Y MIRROR | $\theta_y$ | OPTICAL ANGLE OF Y MIRROR |
| $f_r$ | DISTANCE FROM X MIRROR TO MACHINING PLANE | $\alpha_x$ | MECHANICAL ANGLE OF X MIRROR |
| | | $\alpha_y$ | MECHANICAL ANGLE OF Y MIRROR |

FIG. 7

GALVANOMETER SCANNER

This application is based on and claims the benefit of priority from Japanese Patent Application No. 2017-057031, filed on 23 Mar. 2017, the content of which is incorporated herein by reference.

BACKGROUND OF THE INVENTION

Field of the Invention

The present invention relates to a galvanometer scanner.

Related Art

In a laser welding device conventionally known, a laser head with a galvanometer scanner is provided at the tip of an arm of a multi-axes robot. The galvanometer scanner mentioned herein is a device in which two rotatable mirrors are provided around corresponding two rotary axes (X axis and Y axis) orthogonal to each other. These two mirrors are rotated by a servo motor to perform scanning with a laser beam emitted from a laser source (see patent document 1, for example).

In such a laser welding device, if welding is performed by moving a spot back and forth in a fast cycle in a pattern like a lighting (zigzag pattern) within a tiny range in the X direction and the Y direction like in the case of weaving welding or wobbling welding, for example, deviation of the focal point of a laser beam (deviation in a direction of an optical axis) is compensated for to increase the energy density of the laser beam, generally by controlling a lens in the Z direction by tracing the movement in the X direction and the Y direction so as to drive the lens in the direction of the optical axis of the laser beam.

Patent Document 1: Japanese Unexamined Patent Application, Publication No. 2003-43404

SUMMARY OF THE INVENTION

Inertia is generally low along the X axis and the Y axis merely for driving the mirrors to achieve high responsiveness along these axes. By contrast, regarding the Z axis along which the lens is to be driven, inertia is high so responsiveness is low. Hence, even if the fast cycle allows tracing along the X axis and the Y axis, burden on a mechanism unit is increased relatively along the Z axis. This causes the risk of reliability reduction of the galvanometer scanner.

The technique disclosed by patent document 1 is merely to increase speed, increase precision, and extend lifetime in a galvanometer device such as a laser machine for printed board by restricting vibration unique to the galvanometer device.

In view of the foregoing circumstances, the present invention is intended to provide a galvanometer scanner that can achieve reliability by reducing burden on a mechanism unit.

(1) A galvanometer scanner according to the present invention (galvanometer scanner 50 described later, for example) comprises a mirror (first mirror 51, second mirror 52 described later, for example) for reflecting a laser beam (laser beam L described later, for example) emitted from a laser source (laser source 4 described later, for example), a rotary motor (rotary motor 53, 54 described later, for example) for rotating the mirror, a lens (lens 55 described later, for example) movable in a direction of the optical axis of the laser beam emitted from the laser source, and a direct drive mechanism (direct drive mechanism 56 described later, for example) for driving the lens. The galvanometer scanner scans a machining target (workpiece W described later, for example) with the laser beam by reflecting the laser beam from the laser source on the mirror and passing the laser beam through the lens. The galvanometer scanner comprises: a conversion unit (conversion unit 58 described later, for example) that converts a command for machining position on the machining target to movement commands for the rotary motor and the direct drive mechanism; a control filter unit (control filter unit 59 described later, for example) that removes a weak direct drive component from the movement command for the direct drive mechanism, and then outputs control signals corresponding to the movement commands for the rotary motor and the direct drive mechanism if the movement command for the direct drive mechanism contains the weak direct drive component depending on the movement command for the rotary motor, and falling within an amplitude range not exceeding a predetermined amplitude and within a frequency range not falling below a predetermined frequency; and a control unit (control unit 57 described later, for example) that controls the rotary motor and the direct drive mechanism based on the control signals output from the control filter unit.

(2) In the galvanometer scanner descried in (1), the weak direct drive component in the movement command for the direct drive mechanism removed by the control filter unit may have a waveform of a sine wave, a triangular wave, a rectangular wave, or a saw-tooth wave.

(3) In the galvanometer scanner descried in (1) or (2), the control filter unit may remove the weak direct drive component in the movement command for the direct drive mechanism from the movement command for the direct drive mechanism after the conversion unit converts the command for machining position on the machining target to the movement commands for the rotary motor and the direct drive mechanism.

(4) In the galvanometer scanner descried in (1) or (2), the control filter unit may remove the weak direct drive component in the movement command for the direct drive mechanism from the movement command for the direct drive mechanism before the conversion unit converts the command for machining position on the machining target to the movement commands for the rotary motor and the direct drive mechanism.

A galvanometer scanner provided by the present invention can increase reliability by reducing burden on a mechanism unit during scanning of a machining target with a laser beam.

DETAILED DESCRIPTION OF THE INVENTION

First Embodiment

Figure 1:
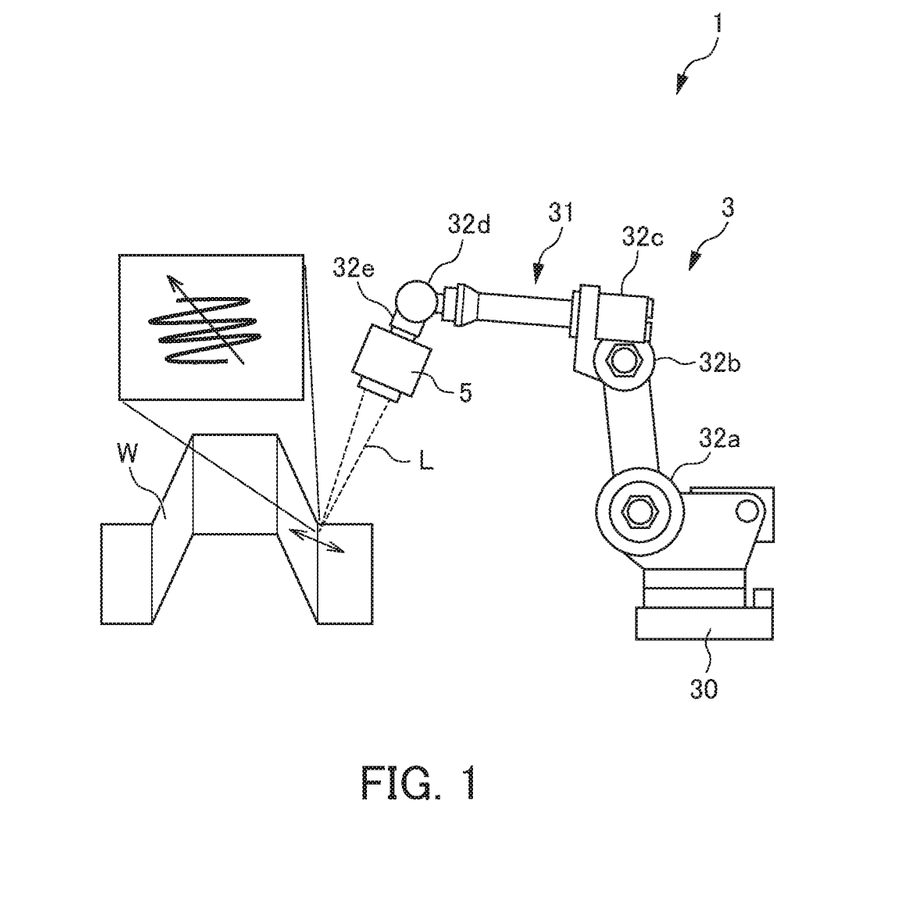
FIG. 1 is an external view of a remote laser welding system according to a first embodiment of the present invention.
Figure 2:
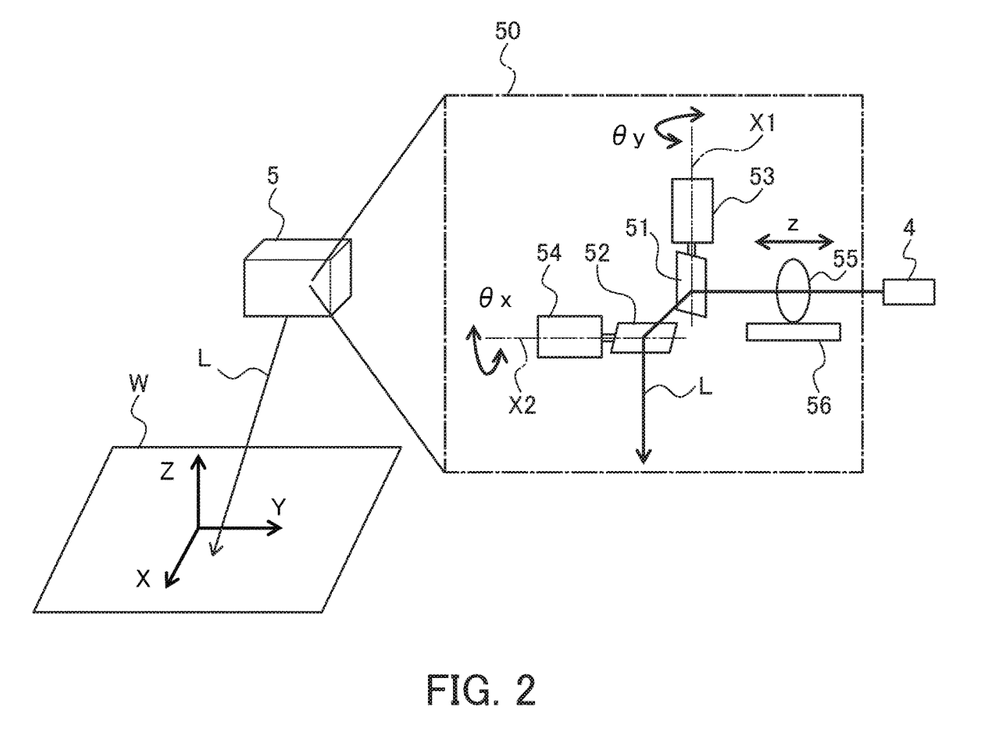
FIG. 2 shows an optical system in the remote laser welding system according to the first embodiment of the present invention.
Figure 3:
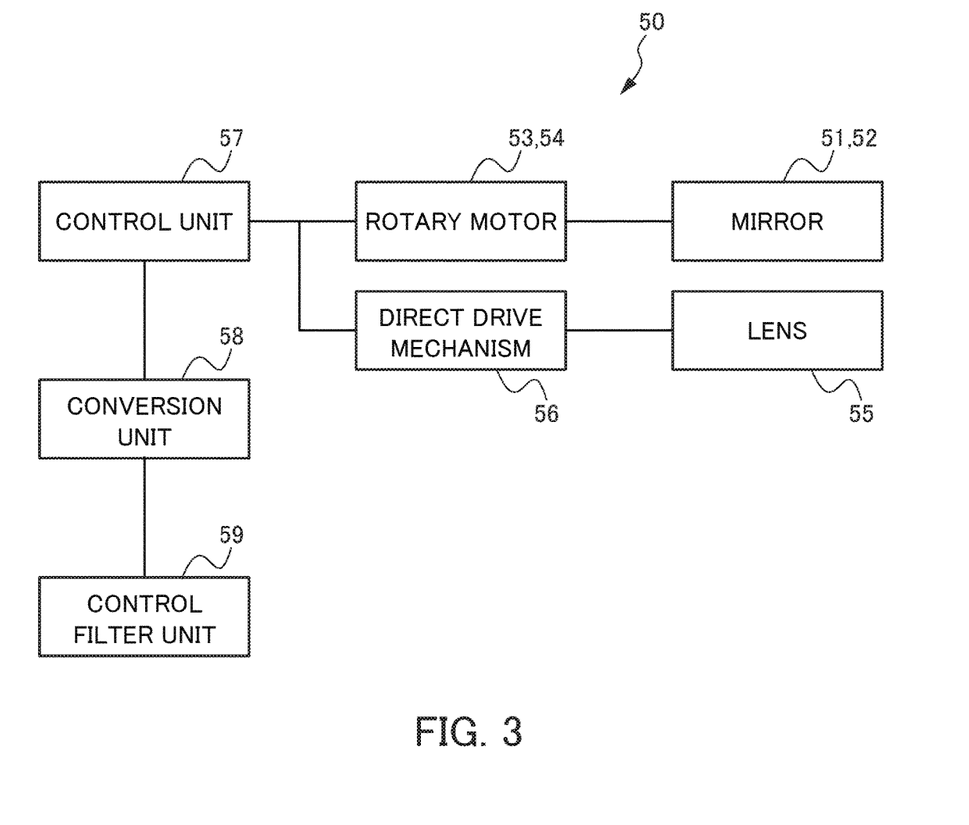
FIG. 3 is a control block diagram of a galvanometer scanner according to the first embodiment of the present invention.
Figure 4:
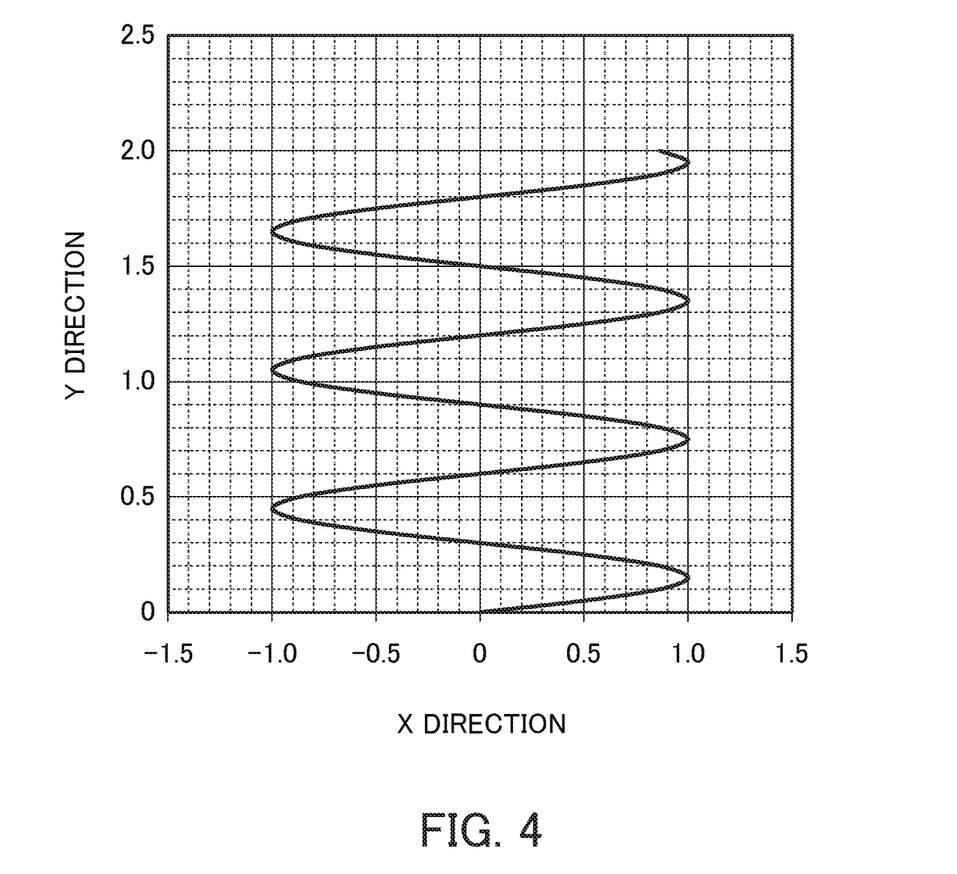
FIG. 4 is a graph showing a correspondence between a command for machining position in the X direction and a command for machining position in the Y direction if movement is made at a fixed speed in the Y direction while oscillation is excited in the X direction.
Figure 5:
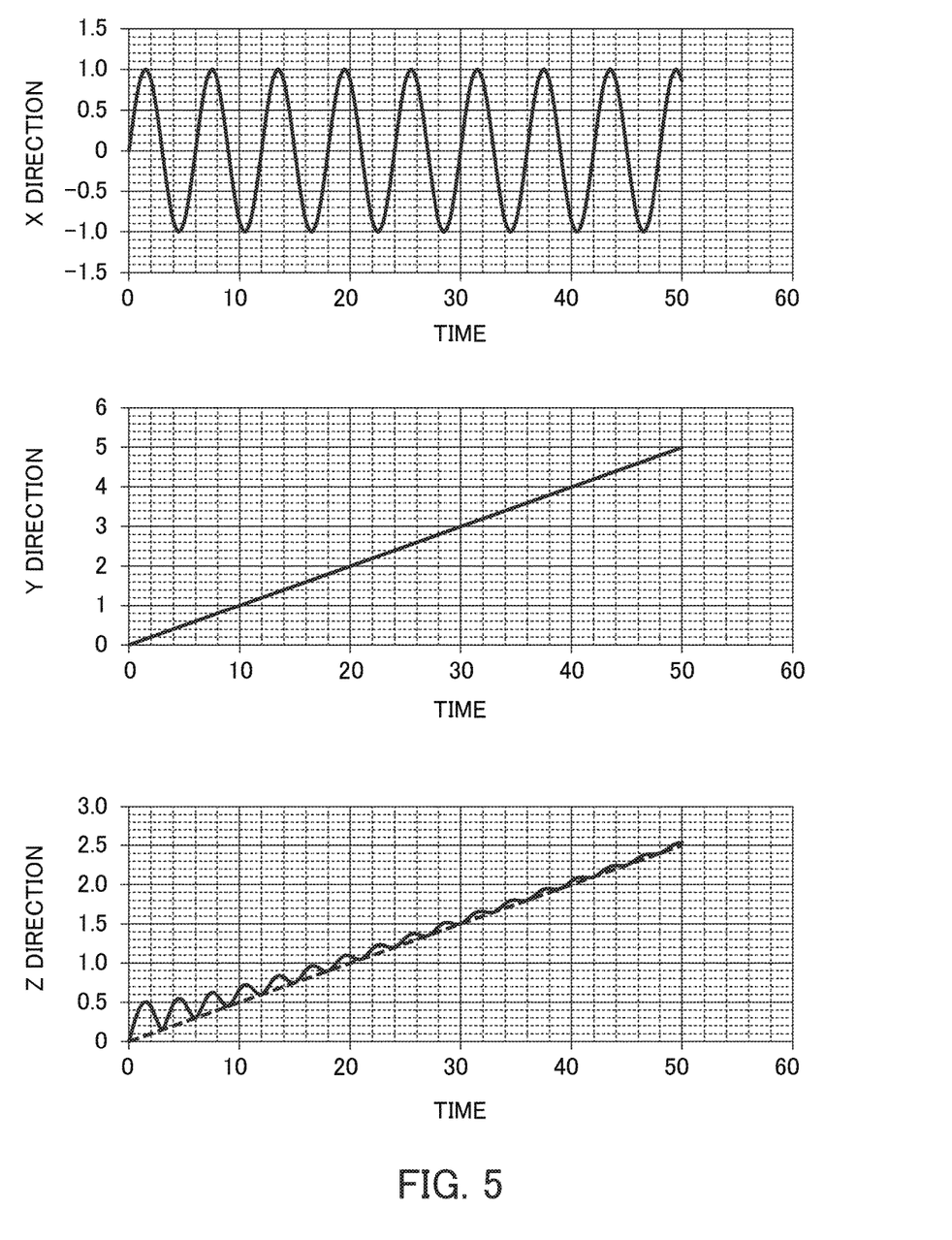
FIG. 5 is a graph showing how a command for machining position changes with time in each of the X direction, the Y direction, and the Z direction if movement is made at a fixed speed in the Y direction while oscillation is excited in the X direction.

FIG. 1 is an external view of a remote laser welding system according to a first embodiment of the present invention. FIG. 2 shows an optical system in the remote laser welding system according to the first embodiment of the present invention. FIG. 3 is a control block diagram of a galvanometer scanner according to the first embodiment of the present invention. FIG. 4 is a graph showing a correspondence between a command for machining position in the X direction and a command for machining position in the Y direction if movement is made at a fixed speed in the Y direction while oscillation is excited in the X direction. FIG. 5 is a graph showing how a command for machining position changes with time in each of the X direction, the Y direction, and the Z direction if movement is made at a fixed speed in the Y direction while oscillation is excited in the X direction.

As shown in FIGS. 1 and 2, a remote laser welding system 1 according to the first embodiment includes a multi-axes robot 3, a laser source 4, and a laser head 5 provided at the tip of an arm 31 of the multi-axes robot 3. The remote laser welding system 1 performs weaving welding as follows. The multi-axes robot 3 operates to convey the laser head 5 at the tip of the arm 31. Then, a laser beam L is emitted from the laser head 5 while being oscillated toward a butt machining point (butt welding point) on a workpiece W as a machining target such as an automobile body.

As shown in FIGS. 4 and 5, this weaving welding is an idea covering not only the case of moving a spot back and forth in a pattern like a lighting on a linear welded part but also the case of moving a spot back and forth in a pattern like a lighting on a welded part having a curved shape (a circle, an ellipse, or a parabola, for example).

As shown in FIG. 1, the multi-axes robot 3 includes a base 30, the arm 31, multiple axes 32a to 32e, and a robot motor (not shown in the drawings) constructed from servo motors for driving corresponding ones of the axes. The operation of the multi-axes robot 3 is controlled by a robot control unit (not shown in the drawings).

As shown in FIG. 2, the laser source 4 is constructed from various types of laser oscillators including a laser medium, an optical resonator, an excitation source, etc. The laser source 4 generates a laser beam L, and emits the generated laser beam L toward a galvanometer scanner 50 described later.

The laser head 5 includes the galvanometer scanner 50 for scanning a butt machining point (butt welding point) on the workpiece W with the laser beam L. As shown in FIG. 2, the galvanometer scanner 50 includes: a first mirror 51 and a second mirror 52 as two mirrors for reflecting the laser beam L in order emitted from the laser source 4; and two rotary motors 53 and 54 for rotating the first mirror 51 and the second mirror 52 about a rotary axis X1 and a rotary axis X2 respectively. The galvanometer scanner 50 includes: a lens 55 movable in a direction of the optical axis of the laser beam L emitted from the laser source 4; and a direct drive mechanism 56 for driving the lens 55.

As shown in FIG. 3, the galvanometer scanner 50 has a control system including a control unit 57, a conversion unit 58, and a control filter unit 59 provided in the galvanometer scanner 50.

The control unit 57 controls the rotary motors 53 and 54 and the direct drive mechanism 56 based on a predetermined control signal. The conversion unit 58 converts a command for machining position on the workpiece W to movement commands for the rotary motors 53 and 54 and the direct drive mechanism 56. A specific method of the conversion will be described later. The control filter unit 59 analyzes the movement command for the direct drive mechanism 56. Based on a result of the analysis, the control filter unit 59 processes the control signal, if appropriate. Then, the control filter unit 59 outputs a resultant signal to the control unit 57. A specific method of the signal processing will be described later.

Figure 6:
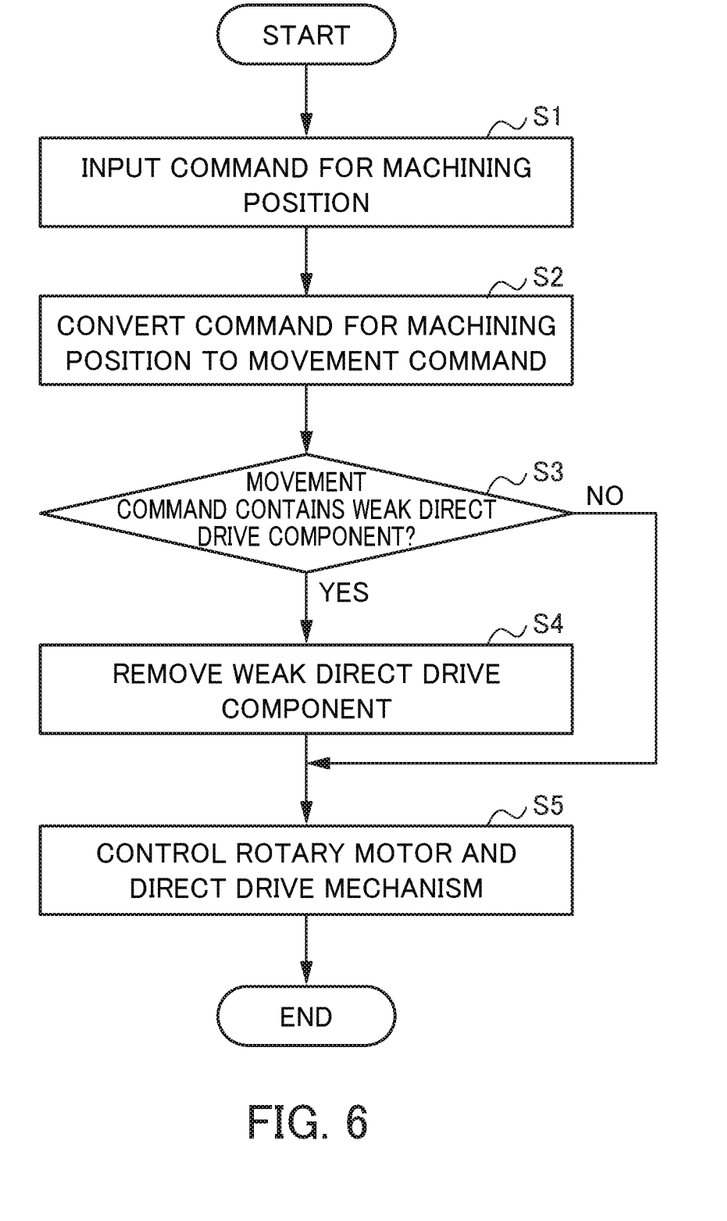
FIG. 6 is a flowchart showing a procedure of performing weaving welding of a workpiece in the remote laser welding system according to the first embodiment of the present invention.

A procedure of performing weaving welding of the workpiece W in the remote laser welding system 1 will be described next. FIG. 6 is a flowchart showing this procedure.

First, in step S1, an operator operates an input unit not shown in the drawings to input a command for machining position on the workpiece W to the galvanometer scanner 50. More specifically, as shown in FIG. 2, the operator introduces a three-dimensional orthogonal coordinate system (XYZ coordinate system) into the workpiece W. In this orthogonal coordinate system, the focal positions (X, Y, Z) of the laser beam L are designated one by one to input the command for machining position. In the case of weaving welding, plotting a command for machining position in the X direction and a command for machining position in the Y direction generates a pattern like a lighting such as the one in FIG. 4 showing movement at a fixed speed in the Y direction and oscillation in the X direction, for example.

Figure 7:
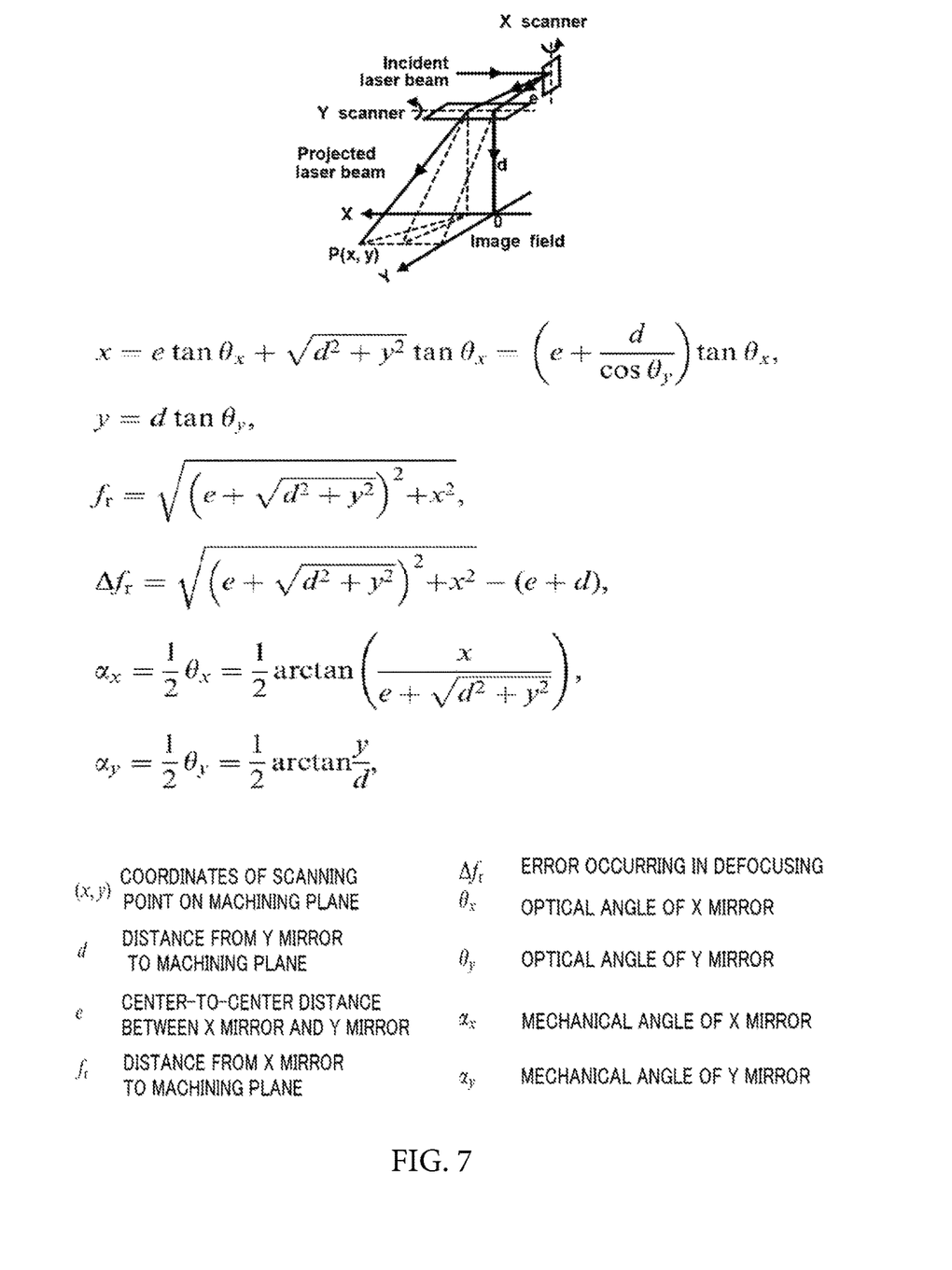
FIG. 7 is a diagram showing the mathematical expression for achieving the operating position for the rotary motors and the direct drive mechanism.

Next, in step S2, in response to receipt of the command for machining position on the workpiece W, the conversion unit 58 of the galvanometer scanner 50 converts the received command for machining position to movement commands for the rotary motors 53 and 54 and the direct drive mechanism 56. More specifically, if the command for machining position on the workpiece W is input by designating the focal positions (X, Y, Z) of the laser beam L one by one in the three-dimensional orthogonal coordinate system as described above, the conversion unit 58 of the galvanometer scanner 50 converts each of these focal positions (X, Y, Z) to an operating position ($\theta_x$, $O_y$, z) for the rotary motors 53 and 54 and the direct drive mechanism 56 using a formula shown in FIG. 7. Here, $\theta_x$ corresponds to the angular position of the second mirror 52 and $\theta_y$ corresponds to the angular position of the first mirror 51. Further, z corresponds to the position of move of the lens 55.

This conversion method is not explained in detail here as it is disclosed in publicly-known documents such as Optics & Laser Technology 37 (2005) pp. 305-311, for example.

Next, in step S3, the control filter unit 59 of the galvanometer scanner 50 determines whether or not the movement command for the direct drive mechanism 56 contains a weak direct drive component depending on the movement command for the rotary motor 53 or 54, and falling within an amplitude range not exceeding a predetermined amplitude and within a frequency range not falling below a predetermined frequency. In many cases, the actual waveform of this weak direct drive component is considered to be the form of a sine wave, a triangular wave, a rectangular wave, or a saw-tooth wave.

If the movement command for the direct drive mechanism 56 is determined not to contain such a weak direct drive component (step S3: NO), the control filter unit 59 outputs control signals as they are corresponding to the movement commands for the rotary motors 53 and 54 and the direct drive mechanism 56 (without performing any processing on the movement commands) to the control unit 57. Then, the flow goes to step S5.

If the movement command for the direct drive mechanism 56 contains such a weak direct drive component (step S3: YES), the flow goes to step S4. In step S4, the control filter unit 59 moves the weak direct drive component from the movement command for the direct drive mechanism 56. Then, the control filter unit 59 outputs control signals corresponding to the movement commands for the rotary motors 53 and 54 and the direct drive mechanism 56. Next, the flow goes to step S5. At this time, the movement command for the direct drive mechanism 56, which has originally had a curved pattern indicated by a solid line in the bottom graph of FIG. 5, assumes a linear pattern indicated by a dashed line in the bottom graph of FIG. 5 as a result of removal of the weak direct drive component.

The reason for defining the weak direct drive component in terms of both an amplitude and a frequency is as follows. If the amplitude of the weak direct drive component is too large while the frequency of this weak direct drive component does not fall below the predetermined frequency, the focal point of the laser beam L may be deviated largely in a manner that depends on the three-dimensional shape of the workpiece W. This causes the risk of reduction in the quality of welding of the workpiece W due to reduction in energy density of the laser beam L. In this case, removing this weak direct drive component is not appropriate. If the frequency of the weak direct drive component is too low while the amplitude of this weak direct drive component does not exceed the predetermined amplitude, the focal point of the laser beam L might be deviated continuously for a long time in a manner that depends on the three-dimensional shape of the workpiece W. Hence, also in this case, removing this weak direct drive component is not appropriate.

Finally, in step S5, in response to receipt of the control signals, the control unit 57 of the galvanometer scanner 50 controls the rotary motors 53 and 54 and the direct drive mechanism 56 based on the received control signals so as to coincide with timing of emission of the laser beam L from the laser source 4. As a result, the laser beam L is applied to the workpiece W along a path in a pattern like a lighting as shown in FIG. 4, thereby performing weaving welding.

The weak direct drive component not causing quality reduction of the workpiece W has been removed from the movement command for the direct drive mechanism 56, if this weak direct drive component was in this movement command. This reduces burden on the direct drive mechanism 56 as a mechanism unit for driving the lens 55, making it possible to increase the reliability of the galvanometer scanner 50.

Then, the remote laser welding system 1 finishes the weaving welding of the workpiece W. Removing the weak direct drive component causes corresponding slight derivation of the focal point of the laser beam L. However, in a long-focus optical system such as the galvanometer scanner 50, if moving distances in the X direction and the Y direction are short, slight deviation of the focal point of the laser beam L does not cause influence of such a degree as to reduce the quality of welding of the workpiece W.

Other Embodiments

The present invention is not limited to the above-described embodiment. The effects described in the embodiment are merely a list of most preferred effects resulting from the present invention. Effects achieved by the present invention are not limited to those described in the embodiment.

For example, in the above-described first embodiment, for weaving welding of the workpiece W, the conversion unit 58 of the galvanometer scanner 50 converts a command for machining position on the workpiece W to movement commands for the rotary motors 53 and 54 and the direct drive mechanism 56. Next, the control filter unit 59 of the galvanometer scanner 50 removes a weak direct drive component in the movement command for the direct drive mechanism 56 from the movement command for the direct drive mechanism 56. The weak direct drive component can be removed either before or after the command for machining position is converted to the movement commands. Thus, the control filter unit 59 of the galvanometer scanner 50 may be configured in such a manner that, before the conversion unit 58 of the galvanometer scanner 50 converts the command for machining position on the workpiece W to the movement commands for the rotary motors 53 and 54 and the direct drive mechanism 56, the control filter unit 59 removes the weak direct drive component in the movement command for the direct drive mechanism 56 from the movement command for the direct drive mechanism 56.

In the above-described first embodiment, welding of the workpiece W is weaving welding. However, as long as welding is performed by moving a spot back and forth in a fast cycle in a pattern like a lighting within a tiny range in the two directions (X direction and Y direction), the welding is not limited to weaving welding. For example, the present invention is applicable in the same way to wobbling welding.

In the above-described first embodiment, the control unit 57, the conversion unit 58, and the control filter unit 59 are provided in the galvanometer scanner 50. Alternatively, all or some of the control unit 57, the conversion unit 58, and the control filter unit 59 may be provided in various servers.

In the above-described first embodiment, the galvanometer scanner 50 is incorporated in the remote laser welding system 1. Meanwhile, the present invention is further applicable in the same way to a case where the galvanometer scanner 50 is incorporated into a facility other than the remote laser welding system 1.

All or some of the various servers of the present invention can be realized by hardware, by software, or by a combination of hardware and software. Being realized by software means being realized by reading and execution of a program by a computer. To configure the servers by hardware, some or all of the servers can be configured using an integrated circuit (IC) such as a large scale integrated circuit (LSI), an application specific integrated circuit (ASIC), or a gate array, or a field-programmable gate array (FPGA), for example.

All or some of the functions of the various servers of the present invention can also be configured by software in a computer including a storage unit such as a hard disk or a ROM storing programs describing all or some of the operations of the various servers of the present invention, a DRAM storing data required for calculation, a CPU, and a bus for connection between the units. In this computer, all or some of these functions can be realized by storing information necessary for calculation into the DRAM and making the CPU execute the programs.

If appropriate, the respective functions of the various servers of the present invention may be configured to be fulfilled on one, or multiple servers. Alternatively, the respective functions of the various servers of the present invention may be fulfilled using a virtual server function on a cloud, for example.

The programs can be stored in various types of computer-readable media and can be supplied to the computer. The computer-readable media include various types of tangible storage media. Examples of the computer-readable media include a magnetic recording medium (a flexible disk, magnetic tape, or a hard disk drive, for example), a magneto-optical recording medium (an magneto-optical disk, for example), a CD read-only memory (CD-ROM), a CD-R, a CD-R/W, and a semiconductor memory (a mask ROM, a programmable ROM (PROM), an erasable PROM (EPROM), a flash ROM, or a random access memory (RAM), for example).

EXPLANATION OF REFERENCE NUMERALS

1 . . . Remote laser welding system
4 . . . Laser source
50 . . . Galvanometer scanner
51 . . . First mirror (mirror)
52 . . . Second mirror (mirror)
53, 54 . . . Rotary motor
55 . . . Lens
56 . . . Direct drive mechanism
57 . . . Control unit
58 . . . Conversion unit
59 . . . Control filter unit
L . . . Laser beam
W . . . Workpiece (machining target)

What is claimed is:

1. A galvanometer scanner comprising a mirror for reflecting a laser beam emitted from a laser source, a rotary motor for rotating the mirror, a lens movable in a direction of the optical axis of the laser beam emitted from the laser source, and a direct drive mechanism for driving the lens, the galvanometer scanner scanning a machining target with the laser beam by reflecting the laser beam from the laser source on the mirror and passing the laser beam through the lens, the galvanometer scanner comprising:

a conversion unit that converts a command for machining position on the machining target to a movement command for the rotary motor and a movement command for the direct drive mechanism;

a control filter unit that removes a weak direct drive component from the movement command for the direct drive mechanism if the weak direct drive component has an amplitude that is equal to or less than a predetermined amplitude and a frequency that is equal to or greater than a predetermined frequency, and then outputs control signals corresponding to each of the movement command for the rotary motor and the movement command for the direct drive mechanism; and a control unit that controls the rotary motor and the direct drive mechanism based on the control signals output from the control filter unit, wherein the weak direct drive component is a waveform, in the movement command for the direct drive mechanism, that arises from the conversion of the command for machining position to the movement command for the rotary motor.

2. The galvanometer scanner according to claim 1, wherein the waveform of the weak direct drive component is a sine wave, a triangular wave, a rectangular wave, or a saw-tooth wave.

3. The galvanometer scanner according to claim 1, wherein, after the conversion unit converts the command for machining position on the machining target to the movement command for the rotary motor and the movement command for the direct drive mechanism, the control filter unit removes the weak direct drive component.

4. The galvanometer scanner according to claim 1, wherein, before the conversion unit converts the command for machining position on the machining target to the movement command for the rotary motor and the movement command for the direct drive mechanism, the control filter unit removes the weak direct drive component.

* * * * *